US006533474B1

(12) United States Patent
Hart et al.

(10) Patent No.: US 6,533,474 B1
(45) Date of Patent: Mar. 18, 2003

(54) CUTTING OF FIBROUS MATERIAL

(75) Inventors: Malcolm P. Hart, Hazlemere Bucks (GB); Michael J. Lewis, Southwell (GB); Robert D. Green, Kirkby in Ashfield (GB)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/372,629

(22) Filed: Aug. 11, 1999

(30) Foreign Application Priority Data

Aug. 21, 1998 (GB) ............................................ 9818144

(51) Int. Cl.[7] ............................ G03B 17/26; B26D 7/10

(52) U.S. Cl. ............................................ 396/513; 83/16

(58) Field of Search ................................ 396/512, 513, 396/518, 535; 83/16; 219/221

(56) References Cited

U.S. PATENT DOCUMENTS

| | | | | |
|---|---|---|---|---|
| 4,065,538 A | | 12/1977 | Gustafson et al. | |
| 4,125,757 A | * | 11/1978 | Ross | 219/121.67 |
| 4,158,762 A | * | 6/1979 | Saunders | 219/221 |
| 4,242,074 A | * | 12/1980 | Lake | 264/163 |
| 4,653,362 A | * | 3/1987 | Gerber | 83/16 |
| 5,512,132 A | * | 4/1996 | Stewart et al. | 156/73.3 |

FOREIGN PATENT DOCUMENTS

GB 2316642 3/1998

* cited by examiner

*Primary Examiner*—Russell Adams
*Assistant Examiner*—Arthur Smith
(74) *Attorney, Agent, or Firm*—Frank Pincelli

(57) ABSTRACT

A method of cutting fibrous material having a semi-rigid base and a fibrous pile in which the fibers in the immediate vicinity of the cut are removed prior to the cut being made. The fibers are removed by the application of heat at a temperature hot enough to vaporize the fibers.

14 Claims, 4 Drawing Sheets

CUTTING OF FIBROUS MATERIAL

FIELD OF THE INVENTION

This invention relates to the field of cutting of fibrous material, such as velvet, particularly, but not exclusively, in relation to the use of fibrous material as light protection strips for containers for light sensitive material.

BACKGROUND OF THE INVENTION

In the manufacture of containers for 35 mm film a metal strip of blanks is pressed into shape and notches cut at the required locations. A fibrous material, such as velvet, is used as light lock material for the containers. Once the slots in the strip of blanks have been cut a further machine applies strips of the light lock material to the blanks. The material has a fibrous pile and a semi-rigid base. The underside of the material has thermo-adhesive backing so that it sticks to the strip of container blanks. Before the strips of blanks can be separated into individual container blanks it is necessary to cut the material strips at the notch points.

In a typical conventional apparatus used to manufacture film cassettes the strips of light lock material are cut by cold rotary knives. It is also known to cut the strips by laser or by ultrasonic means. However, these latter two methods are extremely expensive.

When a cold knife is used to cut the fibrous strips the strands of fibers forming the pile are cut as well as the base fabric. This generates large quantities of loose fibers. These loose fibers are loosened from the base matrix. As there is insufficient adhesive to hold the fibers to the base they no longer have means of fixture and migrate and contaminate the production machinery. It will be appreciated that due to the large amount of loose fibers generated the equipment has to be regularly cleaned.

SUMMARY OF THE INVENTION

The present invention aims to provide a method and apparatus for cutting strips of fibrous material which reduces fiber strand liberation.

According to the present invention there is provided a method of cutting a material having a semi-rigid base and fibrous pile wherein fibers are removed from the vicinity of the cut prior to the cut being made.

Preferably, the fibers are removed by applying heat to the fibrous pile to vaporize contacted fibers. Adjacent fibers may be melted and fused together.

The invention further provides an apparatus for cutting a material having a semi-rigid base and fibrous pile including means for removing fibers at the location of the cut.

Preferably the means for removing fibers comprises vaporizing means for vaporizing fibers with which it comes into contact.

The vaporizing means may comprise a heated member, such as a rigid, non-rotating blade.

The blade may be heated by means of coiled heaters located within a recess of the blade.

The invention enhances the process of cutting fibrous material by removing and/or sealing together the strands of fibers prior to the cut being made through the base matrix. The cut can then be made at a later stage by conventional means. It is, however, possible that the process could be modified so that the means used to remove/seal the strands of fibers could also cut through the base matrix of the material. By vaporizing the fibers in the vicinity of the cut the amount of loose strands of fibers generated is dramatically reduced. Generation of less loose fibers leads to less downtime of the process equipment for cleaning and maintenance. This leads to increased productivity.

Existing machinery for producing film cassettes can readily be adapted to incorporate the invention. It is not necessary to build entirely new machines.

DETAILED DESCRIPTION OF THE INVENTION

Figure 1:
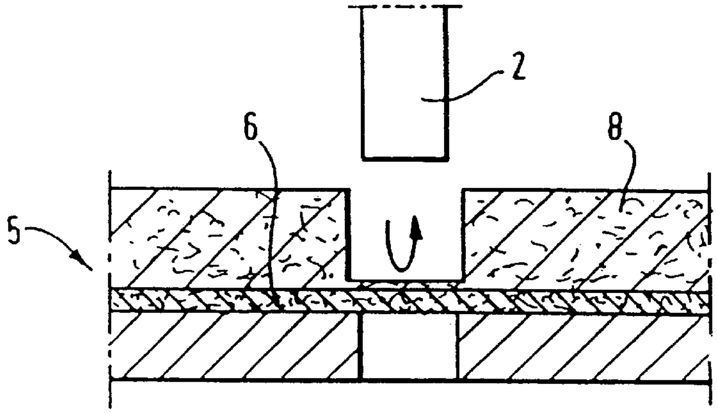
FIG. 1 is a schematic drawing of the invention.

FIG. 1 shows the principle of the invention.

The invention resides in applying heat to the fibrous strips at the location where the cuts are to be made prior to the strips being cut so that the cut edges are sealed, that is, do not have loose fibers. In the embodiment described a strip of velvet material is used. However, it will be understood that any similar fibrous material will benefit from the method and apparatus of the invention.

The strips 5, in this case velvet, comprise a base material 6 and fibers 8. A hot rigid non-rotating blade 2 is plunged into the velvet pile 8 causing vaporization of the fibers contacted by the blade. Adjacent fibers are melted and fuse together forming a molten build-up of material. The melted fibers are thus locked together, reducing the amount of loose fibers, which are released to contaminate the production apparatus. The blade 2 removes the loose fibers or strands in the vicinity of the cut to be made through the base material. The base 6 of the velvet strips, which is less fibrous, is subsequently cut by rotary knives or any other conventional method of cutting the strip.

The blades 2 are manufactured from a high temperature alloy steel such as Inconel Grade 600. The material used for the blades should prevent oxidation and adhesion of the melted fibers to the blade. It is very important that the melted fibers do not adhere to the hot blade as this would result in loss of blade temperature at the blade to fiber point and affect dimensional accuracy of later sealing cycles. Furthermore, if melted fibers adhered to the blade tip the next operation would give a wider sealed area. The blades are preferably profiled to match the contours of the metal strip base. This enables the seal to be driven to an optimum depth. The blades are also preferably configures such that further fiber melt back due to radiated heat can be eliminated.

The blades 2 are located within a heat sealing unit 10. A plurality of blades may be provided within the unit 10. A multiplicity of blades improves the efficiency and operating speed of the sealing process.

Figure 2:
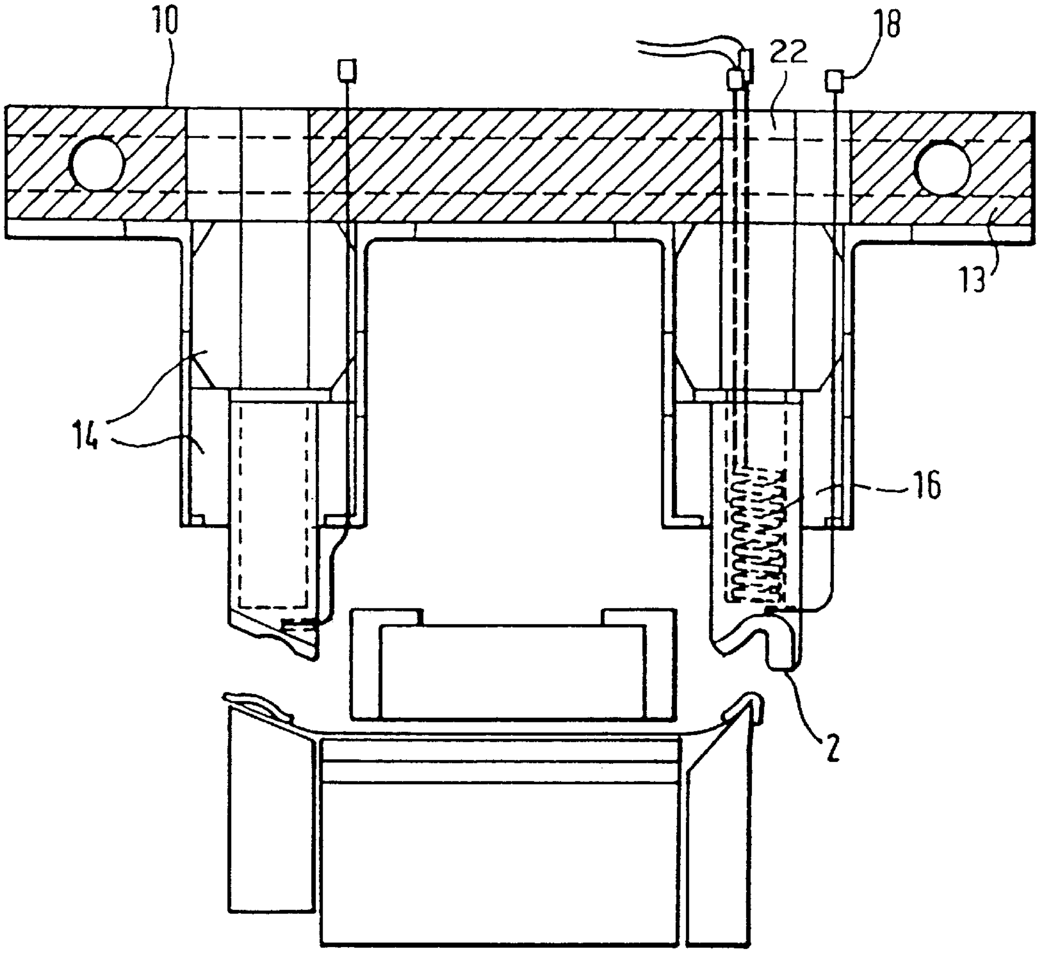
FIG. 2 is a schematic side view of the hot seal unit.
Figure 3A:
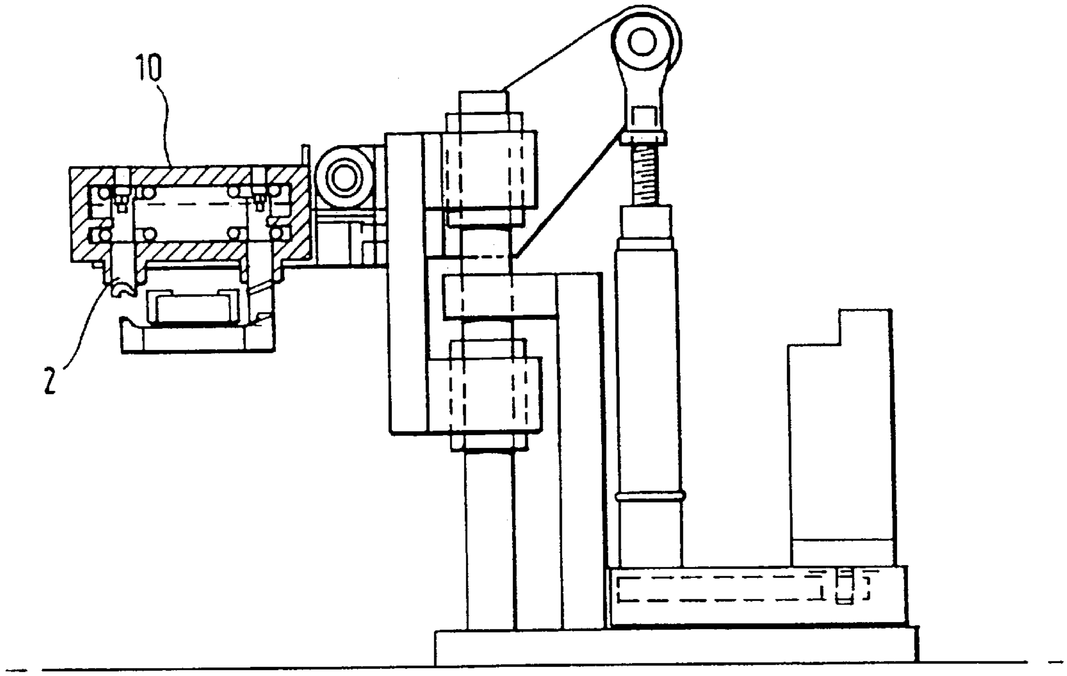
FIGS. 3A and 3B are a schematic side view and perspective view, respectively, of the apparatus of the invention.
Figure 3B:
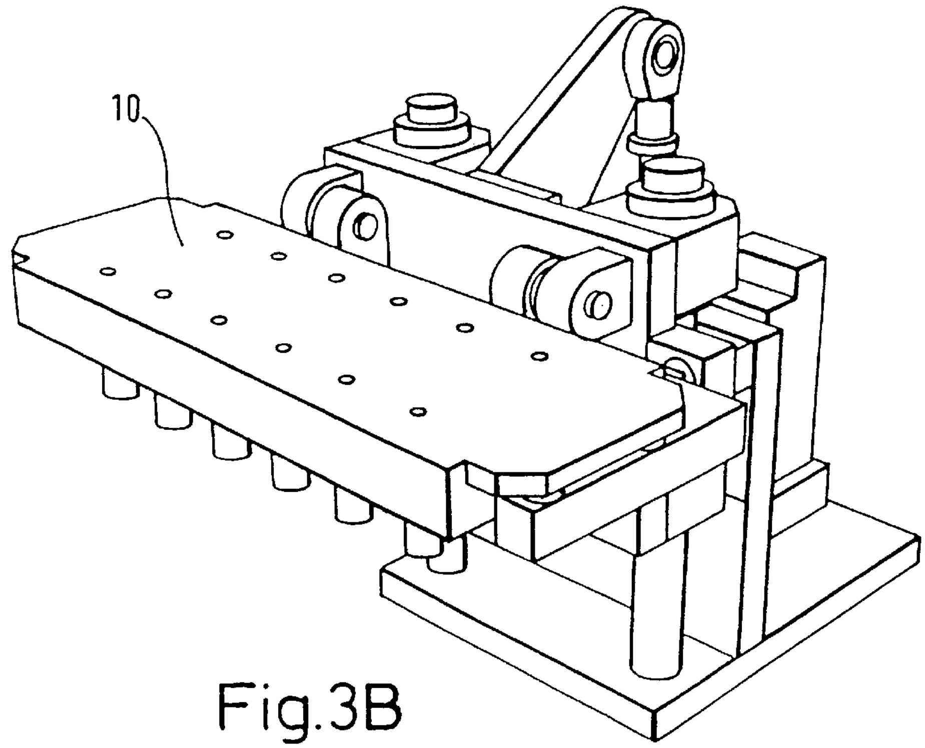

The heat seal unit 10 can be seen in FIG. 2. The blades 2 are mounted from a top plate 13 in a top hat arrangement. The arrangement clamps and thus accurately locates the blades 2 between ceramic spacers 14. The ceramic spacers 14 control the heat flow to the plate 13. It is important that a constant temperature is maintained at the plate 13 as this prevents the relative positions of the hot blades 2 from varying, thus controlling the accuracy of the seal position. A constant temperature is maintained at the plate by incorporating cooling channels 22 within the plate 13. A suitable cooling fluid, such as water, is introduced into the channels.

The blades 2 are heated by means of small electric heaters 16, the heaters being located within a recess in the blade. Preferably the heaters are welded in position to aid heat transfer. The heaters 16 are coiled to enable the intensity of heat required to be generated in the space provided. This enables the correct temperature for sealing to be attained. Standard thermocouples 18 are provided to feed back temperature information from the heaters 16 to heater controllers. The thermocouples fit in a groove along the length of the ceramic spacer, within the top hat sleeve.

The blades are removable so that they are easily replaceable.

The heat seal unit 10 is operated by means of an actuation assembly comprising a bracket and bearing assembly. A ballscrew actuator is used for accurate movement of the heat seal unit to allow the plunge depth, i.e. the downward movement of the hot blade 2, to be accurately controlled. Sensors are mounted from the main bracket to control the home and rest positions. The sensors may also act as a fail safe in case of malfunction. Standard linear bearings are mounted vertically and allow movement of the heat seal unit 10 relative to the main mounting bracket. The unit 10 is mounted from the bracket using a mounting arm.

In operation the apparatus works as follows.

A metal strip of blanks for 35 mm film cartridges is manufactured in a conventional manner. The strip is pressed into the required shape and slots and notches formed at the required locations. A strip of velvet light lock material is then applied at each side of the strip of blanks. The velvet strips adhere to the metal by virtue of a heat actuated backing.

The strip of blanks is then moved and accurately positioned beneath the heat seal unit 10. The hot blades are plunged into the velvet pile and vaporize the fibers 8 contacted. Adjacent fibers are melted and fuse together at the precise location where the velvet strip is to be cut. The blades must be heated to a temperature sufficient to vaporize and melt the fibers. In the case of velvet material the blades are heated to a temperature in excess of 500° C. The strip of blanks is then moved further along the feed bed of the apparatus and the base matrix of the velvet strips cut by rotary knives or other conventional means.

Conventional production apparatus for manufacturing film cassettes may easily be adapted to incorporate the additional step of vaporizing and melting the fibers prior to cutting of the base of the velvet material. The apparatus uses an index mechanism to ensure that the strip of blanks is located accurately so that the velvet strip is cut at precisely the same place as the fibers are vaporized and melted.

Figure 4:
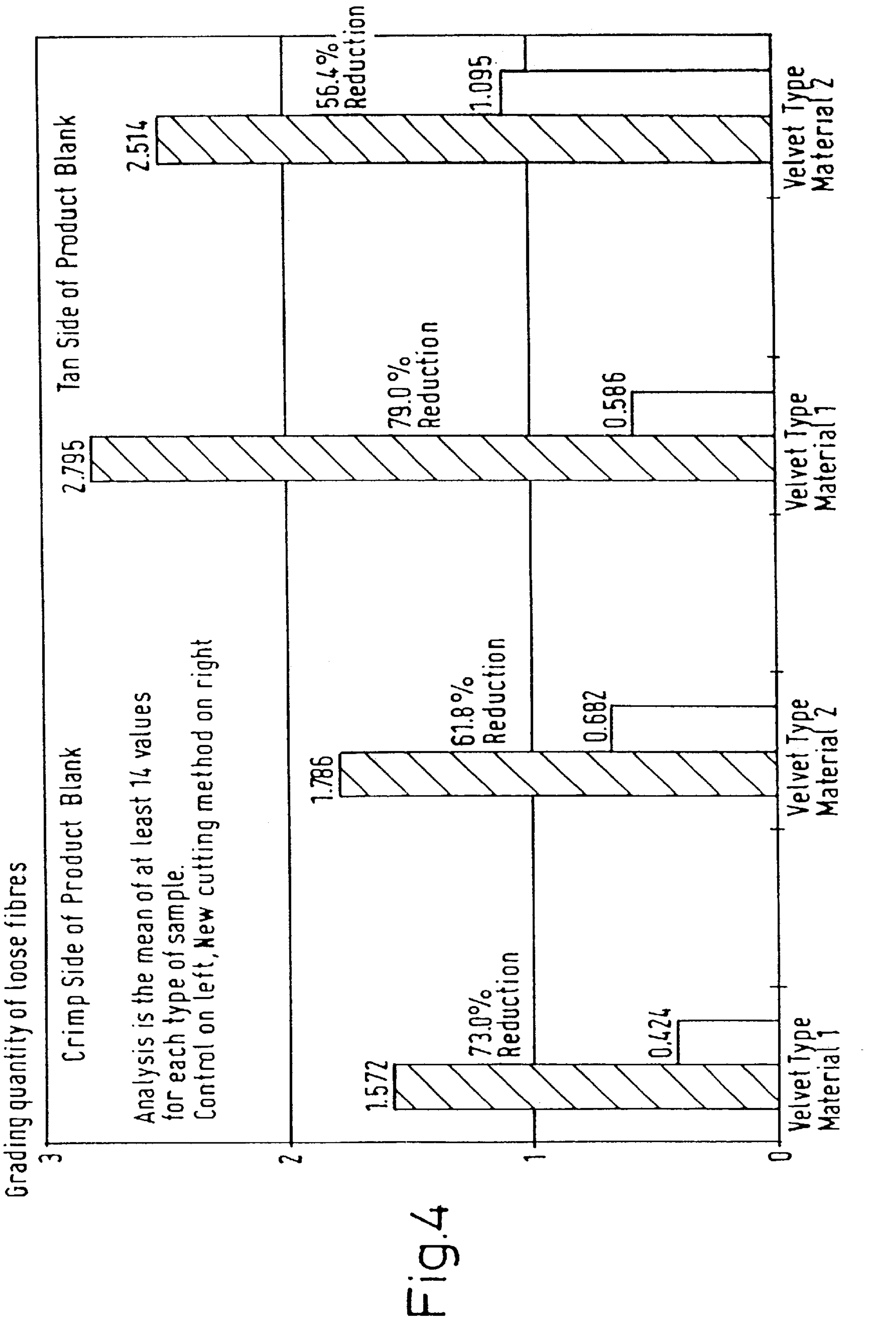
FIG. 4 is a graph showing the results of a test analyzing the amount of loose fibers picked up with and without using the sealing technique of the present invention.
Figure 5A:
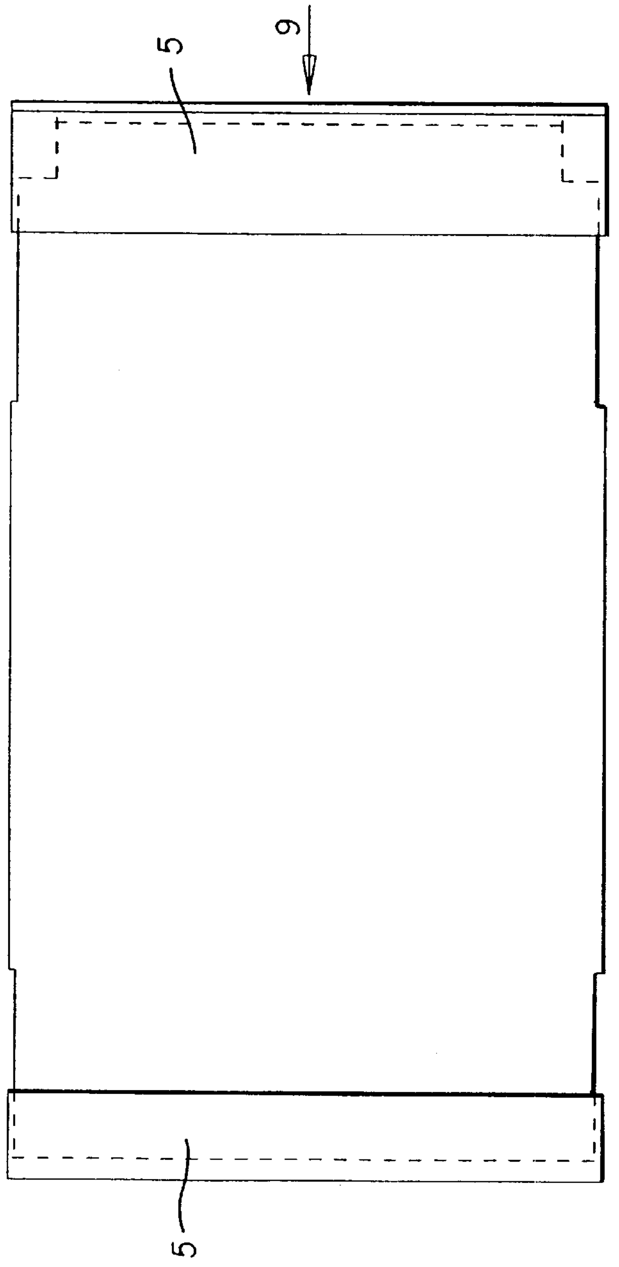
FIG. 5 is a schematic drawing of a film cassette manufactured according to the invention.
Figure 5B:
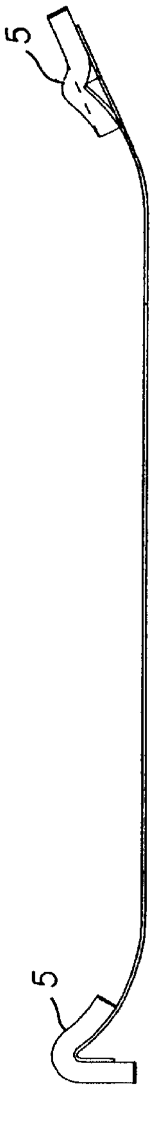

FIG. 4 shows a summary of the results obtained on an analysis of fiber liberation from a cassette formed with the sealing technique of the invention and without the sealing technique.

The analysis consisted of a tacky tape test, taking samples from the cut edge of a single cassette.

The samples were analyzed by microscopy equipment measuring the area coverage of the velvet fibers picked up by the tape. The percentage area measured is used as an indication of the improvement the sealing technique provides to the on line velvet cutting process. Control samples were taken, being samples cut without the sealing application, to allow a before and after measure to be obtained.

The crimp and tan sides of the cassette have to be considered separately as shape and size of the sample are different.

The summary of the results shown in FIG. 4 show that an improvement in excess of 50% is gained by the technique of sealing the fibers prior to cutting.

It is to be understood that various other changes and modifications may be made without departing from the scope of the present invention, the present invention being limited by the following claims.

PARTS LIST

2 rigid non-rotating blade
5 strips
6 base material
8 fibers
10 sealing unit
13 top plate
14 spacers
16 heaters
22 channels

What is claimed is:

1. A method of cutting a material having a semi-rigid base and fibrous pile wherein heat is applied to the fibrous pile, prior to the cut being made, to remove fibers from the vicinity of the cut, the applied heat vaporizing the contacted fibers.

2. A method of cutting as claimed in claim 1 wherein fibers adjacent the vaporized fibers are melted and fused together.

3. A method of cutting as claimed in claim 1 wherein heat is applied by a blade.

4. A method of cutting as claimed in claim 3 wherein the blade is a non-rotating rigid blade.

5. A method of manufacturing film cassette blanks having an opening through which the film passes and having a cut piece of a block of material, the cut piece being of light-lock material having a semi rigid base and fibrous pile, the fibers from the vicinity of the cut being removed by vaporization prior to the cut being made.

6. A method of manufacturing containers for light sensitive material, the containers having light protection strips of fibrous material having a semi-rigid base and fibrous pile, the strips being cut by applying heat to the fibrous pile, prior to the cut being made, to remove fibers from the vicinity of the cut, the applied heat vaporizing the contacted fibers.

7. An apparatus for cutting a material having a semi-rigid base and fibrous pile including a heated member for removing fibers at the location of the cut by vaporizing fibers with which the member comes into contact.

8. An apparatus as claimed in claim 7 wherein the member is heated by means of coiled heaters.

9. An apparatus as claimed in claim 8 wherein the heaters are located within a recess of the member.

10. An apparatus as claimed in claim 7 wherein the member is made from a steel alloy.

11. An apparatus for manufacturing film cassette blanks including cutting apparatus for cutting a material having a semi-rigid base and fibrous pile, said cutting apparatus including a heated member for removing fibers at the location of the cut by vaporizing fibers with which the member comes into contact.

12. An apparatus as claimed in claim 11 wherein the means for removing fibers at the location of the cut is shaped to match the profile of the cassette blanks.

13. An apparatus for manufacturing containers for light sensitive materials including cutting apparatus for cutting a material having a semi-rigid base and fibrous pile, said cutting apparatus including a heated member for removing fibers at the location of the cut by vaporizing fibers with which the member comes into contact.

14. A film cassette having an opening lined by a strip of light lock material having a semi-rigid base and fibrous pile, said strip being cut from a block of material using a method of cutting wherein the fibers in the vicinity of the cut are removed by vaporization prior to the cut being made.

* * * * *